Patented Sept. 5, 1922.

1,427,816

UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

TREATMENT OF ZIRCONIUM ORES.

No Drawing. Application filed September 22, 1920. Serial No. 411,989.

*To all whom it may concern:*

Be it known that I, OTIS HUTCHINS, a citizen of the United States, residing at Niagara Falls, in the county of Niagara and State of New York, have invented a new and useful Improvement in the Treatment of Zirconium Ores, of which the following is a full, clear, and exact description.

My invention relates to an improved process for the production of refractory products consisting largely of zirconium oxide.

Zirconium oxide or ores of zirconium oxide have been used as refractories with considerable success. The material in the pure state has a very high melting point and has other desirable characteristics such as low heat conductivity. Pure zirconia has a melting point of about 3000° C. However, it has been found very costly to purify crude zirconium oxide by means of chemical treatment and consequently comparatively little of the pure oxide is being used for refractory purposes. Zirconium ores such as are commercially obtainable contain about 70% of zirconium oxide and have a melting point of about 1800° C. It is thus apparent that the refractoriness of this material depends upon the purity.

I have discovered a relatively cheap method of purifying zirconium ores which consists of fusing the crude ore in an electric furnace in the presence of a reducing agent. A typical analysis of a zirconium ore is as follows:

| | |
|---|---|
| Ign. loss | 2.8% |
| $ZrO_2$ | 64.9% |
| $SiO_2$ | 19.0% |
| $Fe_2O_3$ | 7.5% |
| $TiO_2$ | 1.1% |

When an ore of this character is fused in the presence of a reducing agent such as carbon there is a reduction to the metallic state of the iron oxide and silica along with a small portion of the zirconium oxide. These reduced metals form an alloy which can be separated from the fused oxides.

As an illustration of this process I have fused in an electric furnace a mixture consisting of 95.5% zirconium ore and 4.5% of coke. The ore had the following composition:

| | |
|---|---|
| Ign. loss | 2.8% |
| $ZrO_2$ | 64.9% |
| $SiO_2$ | 19.0% |
| $Fe_2O_3$ | 7.5% |
| $TiO_2$ | 1.1% |

The fused oxides from this experiment analyzed as follows:

| | |
|---|---|
| Ign. loss | 0.0 |
| $ZrO_2$ | 87.2 |
| $SiO_2$ | 7.7 |
| $Fe_2O_3$ | 1.7 |
| $TiO_2$ | .5 |

The same ore described above fused in the presence of 13.2% of coke yielded a product having the following analysis:

| | |
|---|---|
| Ign. loss | 0.0 |
| $ZrO_2$ | 97.7 |
| $SiO_2$ | .3 |
| $Fe_2O_3$ | .2 |
| $TiO_2$ | .5 |

The product obtained from these fusions is a hard dark colored crystalline mass, thoroughly shrunk. It has a large field of application in the manufacture of refractory products.

Under certain conditions I have found it desirable to add a certain amount of metallic iron to the mixture being fused in order to produce a metallic alloy having magnetic properties. This makes possible an easy separation of the metallic and non-metallic products by means of magnetic separators.

I do not wish to limit myself to the exact raw materials described, but may use as a raw material any ore or material containing a high percentage of zirconium oxide. For the reducing agent, I may use carbon in its various forms or other reducing agents. If desirable, I may add metallic iron to the charge mixture. I do not wish to limit myself as to the degree of purification except to state that the fused product should contain more zirconium oxide than the original ore.

I claim:

1. The process of treating zirconium ores to produce substantially pure zirconia, which consists in subjecting a mixture of the impure zirconium ore and reducing agent to heat sufficient to reduce a portion of the impurities of the ore to metallic form and then separating the impurities from the zirconia.

2. The process of treating zirconium ores to produce substantially pure zerconia, which consists in subjecting a mixture of zirconium ore and reducing agent to heat sufficient to reduce a portion of the impurities of the ore to metallic form without substantial reduction of the zirconia.

3. The process of treating zirconium ores to produce substantially pure zerconia, which consists in subjecting a mixture of zirconium ore and reducing agent to heat sufficient to reduce a portion of the impurities and fuse the zirconia without substantial reduction of the zirconia and separating the reduction products from the fused zirconia.

4. The process of treating zirconium ores to produce substantially pure zirconia which consists in subjecting a mixture of zirconium ore and carbon to heat sufficient to reduce a portion of the impurities and fuse the zirconia without substantial reduction of the zirconia and separating the reduction products from the fused zirconia.

In testimony whereof, I have hereunto set my hand.

OTIS HUTCHINS.